US012786128B2

(12) United States Patent
Johansson

(10) Patent No.: US 12,786,128 B2
(45) Date of Patent: Nov. 3, 2026

(54) DISTRIBUTED UNIT, CENTRAL UNIT AND METHODS PERFORMED THEREIN FOR PACKET MANAGEMENT

(71) Applicant: Telefonaktiebolaget LM Ericsson (publ), Stockholm (SE)

(72) Inventor: Ingemar Johansson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 721 days.

(21) Appl. No.: 18/002,353

(22) PCT Filed: Jun. 29, 2020

(86) PCT No.: PCT/SE2020/050677

§ 371 (c)(1),
(2) Date: Dec. 19, 2022

(87) PCT Pub. No.: WO2022/005344

PCT Pub. Date: Jan. 6, 2022

(65) Prior Publication Data

US 2023/0344772 A1 Oct. 26, 2023

(51) Int. Cl.
*H04L 47/10* (2022.01)
*H04W 28/02* (2009.01)

(52) U.S. Cl.
CPC ......... *H04L 47/18* (2013.01); *H04W 28/0284* (2013.01); *H04W 28/0289* (2013.01)

(58) Field of Classification Search
CPC .............. H04L 47/18; H04W 28/0284; H04W 28/0289
See application file for complete search history.

(56) References Cited

U.S. PATENT DOCUMENTS 10,135,735 B2 * 11/2018 Yousaf .................... H04L 47/32
2014/0328175 A1 * 11/2014 Pan .................... H04L 47/6255 370/235
2018/0351811 A1 * 12/2018 Taheri .................... H04L 47/10
(Continued)

FOREIGN PATENT DOCUMENTS

CN 103414650 B 12/2016
CN 111050341 A * 4/2020 ........ H04W 28/0289
WO 2019196630 A1 10/2019

OTHER PUBLICATIONS

3GPP TSG-RAN WG2 #107bis Tdoc R2-1913888 Chongqing, China, Oct. 14-18, 2019 Revision of R2-1910724 Source: Ericsson, Vodafone, Nokia, Nokia Shanghai Bell, Sprint Title: L4S support in 5G (Year: 2019).*
(Continued)

*Primary Examiner* — Sujoy K Kundu
*Assistant Examiner* — Weibin Huang
(74) *Attorney, Agent, or Firm* — Weisberg I.P. Law, P.A.

(57) ABSTRACT

A method performed by a Distributed Unit (DU) for managing packets in a wireless communication network is provided. The DU determines a load in a buffer; and marks a packet from a Central Unit (CU), with a first indication related to end-to-end latency due to the determined load in the buffer. The DU then transmits the packet with the first indication to a UE; and transmits to the CU, a second indication indicating a probability that packets are marked from the UE.

14 Claims, 14 Drawing Sheets

(56) References Cited

U.S. PATENT DOCUMENTS

| | | | | |
|---|---|---|---|---|
| 2019/0319882 | A1 | 10/2019 | Yuan et al. | |
| 2019/0327644 | A1* | 10/2019 | Gao | H04L 47/10 |
| 2020/0053018 | A1* | 2/2020 | White | H04L 47/6275 |
| 2020/0252988 | A1* | 8/2020 | Wang | H04W 76/19 |
| 2021/0029041 | A1 | 1/2021 | Yuan et al. | |
| 2022/0408308 | A1* | 12/2022 | Wu | H04W 48/20 |

OTHER PUBLICATIONS

Jointly Coordinating ECN and TCP for Rapid Adaptation to Varying Bandwidth Archan Misra, Teunis Ott (Year: 2020).*

English translation CN_111050341_A_Chen (Year: 2020).*

3GPP TSG-RAN WG2 #107bis Tdoc R2-1913888 Chongqing, China, Oct. 14-18, 2019 Source: Ericsson, Vodafone, Nokia, Nokia Shanghai Bell, Sprint Title: L4S support in 5G (Year: 2019).*

International Search Report dated Mar. 18, 2021 for Application No. PCT/SE2020/050677 filed Jun. 29, 2020, consisting of 12 pages.

3GPP TSG-RAN WG2 #107bis Tdoc R2-1913888; Title: L4S support in 5G; Agenda Item: 6.20.2; Source: Ericsson, Vodafone, Nokia, Nokia Shanghai Bell, Sprint; Document for: Discussion, Decision; Location and Date: Chongqing, China, Oct. 14-18, 2019, consisting of 11 pages.

Misra et al. "Jointly coordinating ECN and TCP for rapid adaptation to varying bandwidth" Telcordia Technologies, Inc., 2001, pp. 719-725, consisting of 7 pages.

3GPP TSG RAN WG2 Meeting#105 R2-1901387; Title: Flow Control in IAB; Agenda Item: 11.1.2; Source: Ericsson; Document for: Discussion and Agreement; Location and Date: Athens, Greece, Feb. 25-Mar. 1, 2019, consisting of 5 pages.

White et al. Low Latency DOCSIS: Technology Overview; CableLabs; Feb. 2019, DOCSIS Research & Development, consisting of 21 pages.

3GPP TS 38.425 V15.0.0 3rd Generation Partnership Project; Technical Specification Group Radio Access Network; NG-RAN; NR user plane protocol (Release 15); Dec. 2017, consisting of 17 pages.

* cited by examiner

DISTRIBUTED UNIT, CENTRAL UNIT AND METHODS PERFORMED THEREIN FOR PACKET MANAGEMENT

CROSS-REFERENCE TO RELATED APPLICATION

This application is a Submission Under 35 U.S.C. § 371 for U.S. National Stage Patent Application of International Application Number: PCT/SE2020/050677, filed Jun. 29, 2020 entitled "DISTRIBUTED UNIT, CENTRAL UNIT AND METHODS PERFORMED THEREIN," the entirety of which is incorporated herein by reference.

TECHNICAL FIELD

Embodiments herein relate to a Distributed Unit (DU), a Central Unit (CU) and methods performed therein for communication. Furthermore, a computer program product and a computer readable storage medium are also provided herein. In particular, embodiments herein relate to managing packets in a wireless communication network.

BACKGROUND

In a typical wireless communication network, User Equipments (UE)s, also known as wireless communication devices, mobile stations, Stations (STA) and/or wireless devices, communicate via a Radio Access Network (RAN) to one or more Core Networks (CN)s. The RAN covers a geographical area which is divided into service areas or cell areas, with each service area or cell area being served by a radio network node such as a radio access node e.g., a Wi-Fi access point or a Radio Base Station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the UE within range of the radio network node.

A Universal Mobile Telecommunications System (UMTS) is a Third Generation (3G) telecommunication network, which evolved from the Second Generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project, which also have completed release for a 5$^{th}$ generation network a New Radio (NR), and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

The 5G System (5GS) defined by 3GPP Release-15 introduces both a New Radio Access Network (NG-RAN) and a new core network denoted as 5GC.

Similar to E-UTRAN, the NG-RAN uses a flat architecture and comprises base stations, called gNBs, which are interconnected with each other by means of the Xn-interface. The gNBs are also connected by means of the NG interface to the 5GC, more specifically to the Access and Mobility Function (AMF) by the NG-C interface and to the User Plane Function (UPF) by means of the NG-U interface. The gNB in turn supports one or more cells which provide the radio access to the UE. The radio access technology, called New Radio (NR) is Orthogonal Frequency Division Multiplex (OFDM) based like in LTE and offers high data transfer speeds and low latency.

It is expected that NR will be rolled out gradually on top of the legacy LTE network starting in areas where high data traffic is expected. This means that NR coverage will be limited in the beginning and users must move between NR and LTE as they go in out of coverage. To support fast mobility between NR and LTE and avoid change of core network, LTE base stations called Evolved Node B (eNB, eNodeB) will also connect to the 5G CN and support the Xn interface. An eNB connected to 5GC is called a Next Generation eNB (ng-eNB) and is considered part of the NG-RAN, see FIG. 1. LTE and ng-eNBs are described for completeness and will not be considered further in this document.

The logical architecture of the gNB may be split into a CU and DU which are connected through an F1 interface. The CU-DU split enables a centralized deployment, which in turn simplifies e.g. coordination between cells, without putting extreme demands on the front-haul transmission bandwidth and latency. The internal structure of the gNB is not visible to the core network and other RAN nodes, so the gNB-CU and connected gNB-DUs, also referred to as legs of the CU, are only visible to other gNBs and the 5GC as a gNB.

Several different CU-DU split options were considered in 3GPP in the initial phase of the Release-15 standardization. The NR protocol stack, which includes Physical (PHY) layer, Medium Access Control (MAC) layer, Radio Link Control (RLC) layer, Packet Data Convergence Protocol (PDCP) layer, and Radio Resource Control (RRC) layer, was taken as a basis for this investigation and different split points across the protocol stack was investigated. After careful analysis, 3GPP agreed on a higher layer split where PDCP and RRC reside in the CU and RLC, MAC, and PHY reside in the DU. This is shown in FIG. 2.

Flow control between CU and DU is in certain scenarios necessary to achieve robustness and high throughput. One example is Dual Connectivity, wherein network connectivity for a UE is handled by two or more Radio Access Technologies (RAT). Here, a typical flow control algorithm seeks to forward packets to a UE in a timely manner and at the same time avoid sending too much data over one leg, which would otherwise cause unnecessary end-to-end also referred to as end-2-end and e2e, delay. The flow control in the CU monitors the queues in each DU by means of feedback from the DUs to the CU. Based on this feedback the sending rate towards each DU is adjusted which further utilizes the associated Remote Radio Unit (RRU) for communication with the UE. The feedback for the flow control is described in 3GPP TS 38.425 v. 15.0.0.

The actual flow control algorithm can vary and furthermore, each algorithm may require different types of feedback. The various parts of the state of the art flow control is outlined in FIG. 3. The main purpose of the flow control in the CU is to ensure that most of the queue is in the CU, the queues in the DUs should ideally be as short as possible, without sacrificing link utilization.

To handle congestion and to manage end-to-end latency not increasing too much, Active Queue Management (AQM) is used on the CU side to bring down the queues in the CU by discarding packets as needed.

SUMMARY

As part of developing embodiments herein, it has been identified a problem which first will be discussed.

Flow control is a good method to achieve packet transmission and ensure high end-to-end throughput in e.g. Dual Connectivity deployments. There are a few problems with previous approaches that will be explained below:

Added Latency;

Having flow control on the CU side leads to that a queue is built up on the PDCP layer. This is since the flow control serves to forward packets at a rate that is sustained by the DUs, the queue in the CU serves to absorb packet bursts and to avoid that too much data is forwarded to the DUs even though endpoints may transmit at a too high rate. Large queues further leads to a significant increase in latency with regards to queueing time. In traditional approaches, the AQM deployed on the CU side to keep the queues short, but have a limited effect when queues rapidly build up due to traditional flow control ensuring a high rate of packets queueing on the CU side. Due to high rates of packets, queues are also built up on the DU side, and causes further latency increase. As an additional cost, larger queues lead to an increase in memory consumption.

Complexity;

Flow control is typically window based i.e. it can handle a certain amount of outstanding concurrent packets referred to as a window, based on some dynamic window size. Since the window based approach to flow control, a packet transmission needs to be controlled by the amount of packets that are acknowledged by the DU sending Acknowledgements (ACK). As the ACK rate needs to be limited to avoid high overhead in the control traffic and overload in the flow control, the packet transmission also needs to be paced out accordingly. The adjustment of the actual size of the window imposes additional complexity. In this manner, the flow control may become a computational burden, especially as link bitrates increase.

Added Control Loop;

The flow control adds an extra control loop into a packet transmission system that already contains several nested control loops such as the Hybrid Automatic Repeat Request (HARQ) loop on the MAC layer or the transport protocol transmission control loop. The extra control loop given by the CU-DU flow control may lead to additional unwanted side effects on the end-to-end latency as it may interfere with the transport protocol. This is since the different control loops may have similar time constants and may e.g. begin to interact with one another. In some cases, this causes an oscillating behavior where the throughput may begin to vary with a large magnitude. In some cases the flow control also interferes with the application layer as the application layer itself may have a rate control loop. One typical example is the rate switching logic present in popular Video on Demand (VoD) services that adjust a media quality e.g. a bitrate based on an estimated throughput. In this way an additional rate control loop on the application layer is needed when using video rate and/or quality control in rate adaptive Video on Demand streaming applications.

Due to above identified problems, in particular with regards to increasing complexity in determining suitable window size, flow control may become unfeasible to deploy and hence need to dynamically be turned off when the rate of packets becomes too high.

Hence, this poses a further problem of determining when and how to dynamically disable flow control due to constrained resources.

An object of embodiments herein is to provide a mechanism for improving performance of a wireless communication network using network nodes that comprise CUs and DUs or are split into CUs and DUs.

According to an aspect the object may be achieved by a method performed by a DU for handling packets in a wireless communication network. The DU determines a load in a buffer. The DU marks a packet from a CU with a first indication related to end-to-end latency due to the determined load in the buffer. The DU then transmits the packet with the first indication to a UE; and transmits a second indication to the CU. The second indication indicates a probability that packets are marked from the UE.

According to another aspect of embodiments herein, the object is achieved by a method performed by a CU for managing packets in a wireless communication network. The CU distributes packets between two or more DUs. The CU receives a first packet from a first DU with a second indication indicating a probability that packets are marked from the UE. The CU receives a second packet from a second DU with a third indication. The third indication indicates a probability that packets are marked from the UE. The CU then transmits an incoming packet at the CU, to one of the at least two DUs based on the second and third indications.

According to yet another aspect the object may be achieved by providing a distributed unit, DU and a central unit, CU configured to perform the methods herein.

It is furthermore provided herein a computer program product comprising instructions, which, when executed on at least one processor, cause the at least one processor to carry out any of the methods above, as performed by the DU or the CU respectively. It is additionally provided herein a computer-readable storage medium, having stored therein a computer program product comprising instructions which, when executed on at least one processor, cause the at least one processor to carry out the method according to any of the methods above, as performed by the DU or the CU respectively.

Since the CU receives the second and the third indications of probability that packets are marked from a UE using a present marking process, the CU is enabled, in an efficient manner, to determine the congestion and end-to-end latency associated with each of the at least two DUs forwarding said packets to the UE, and thus, the CU may transmit the packets to the DU with the least associated congestion and therefore achieve lower latency for the packets. This results in an improved performance of the wireless communication network comprising a CU and DUs.

BRIEF DESCRIPTION OF THE DRAWINGS

Embodiments will now be described in more detail in relation to the enclosed drawings, in which.

DETAILED DESCRIPTION

Figure 1:
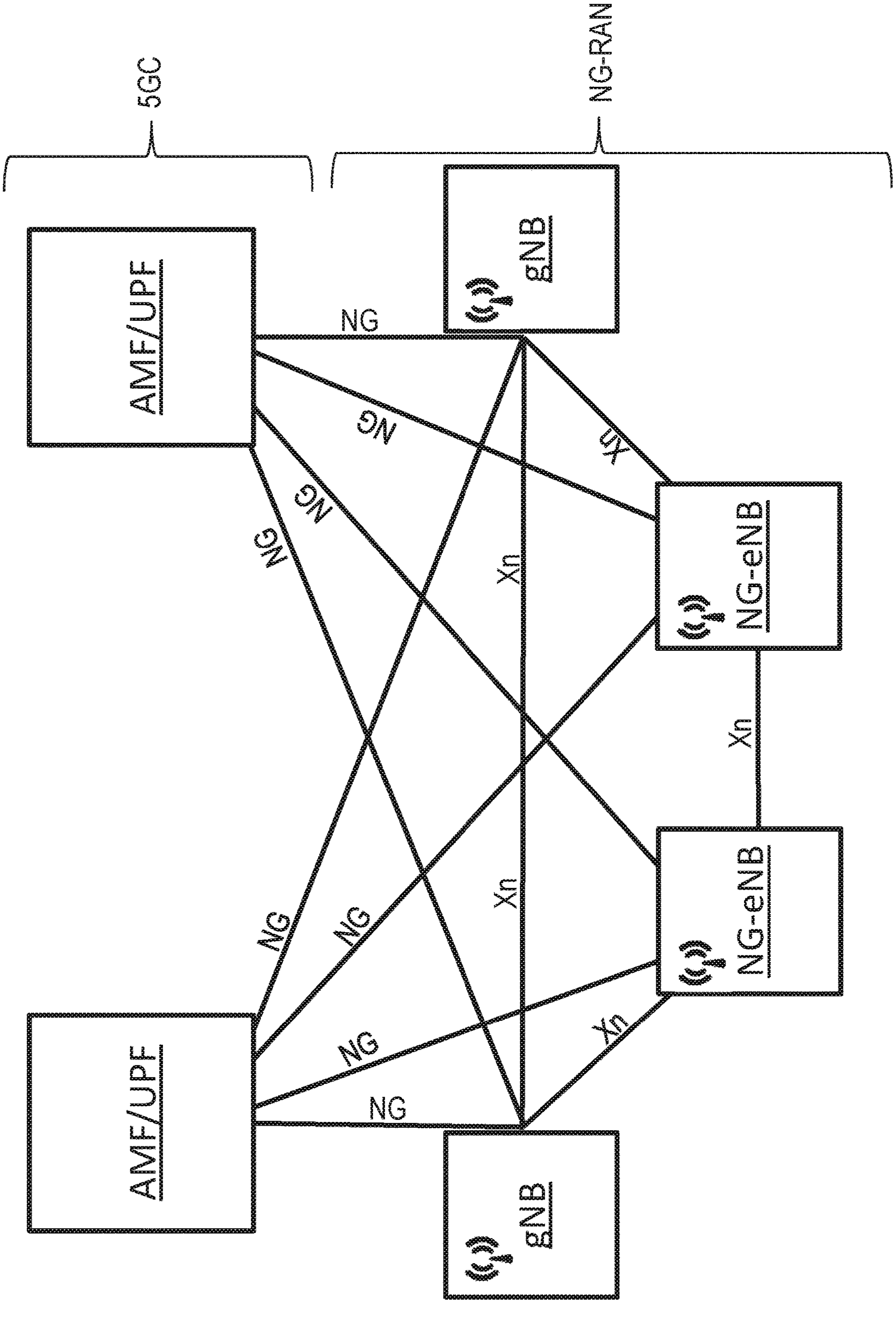
FIG. 1 is a schematic block diagram depicting an NR architecture according to prior art.
Figure 2:
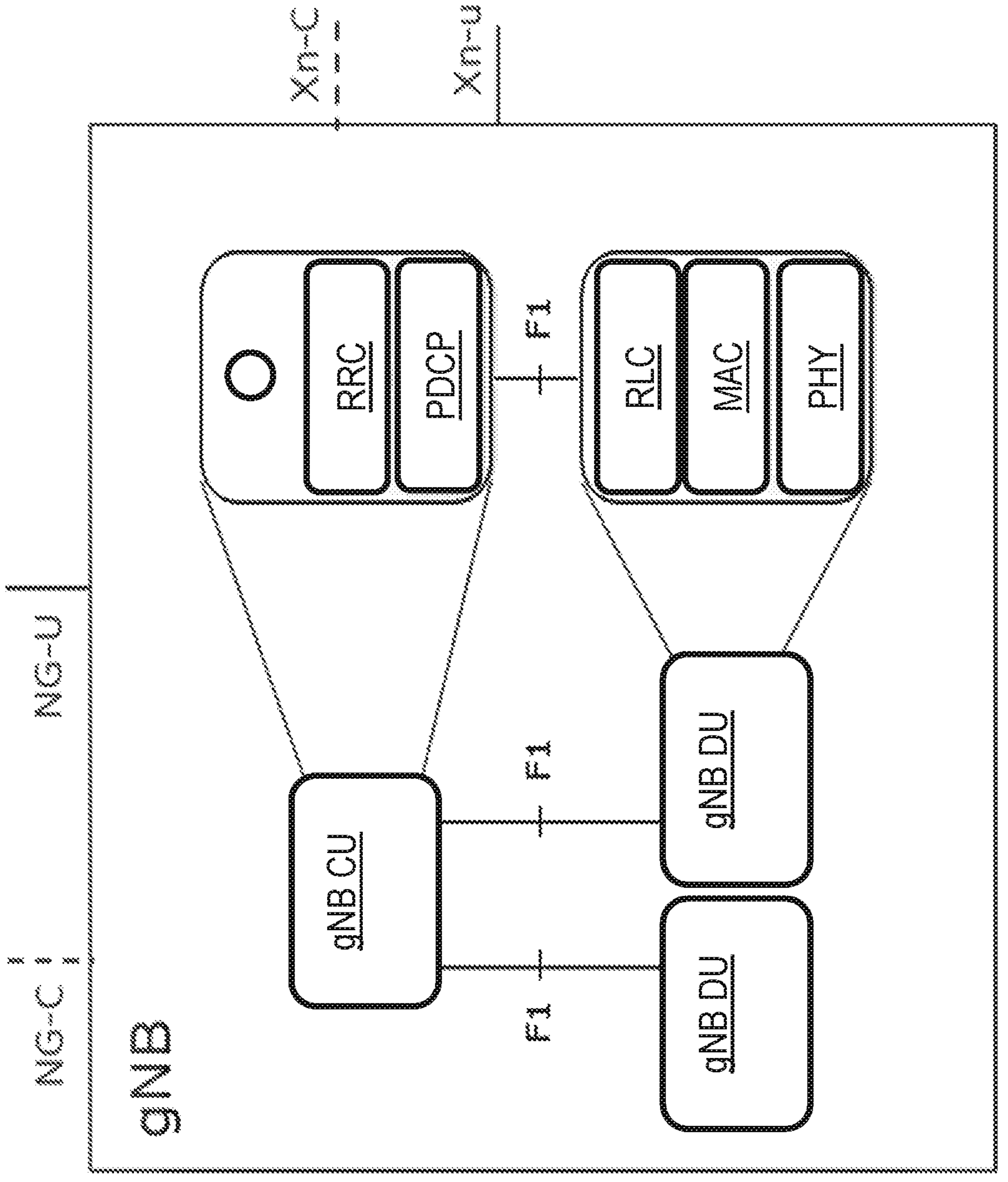
FIG. 2 is a schematic block diagram depicting a logical architecture of prior art.
Figure 3:
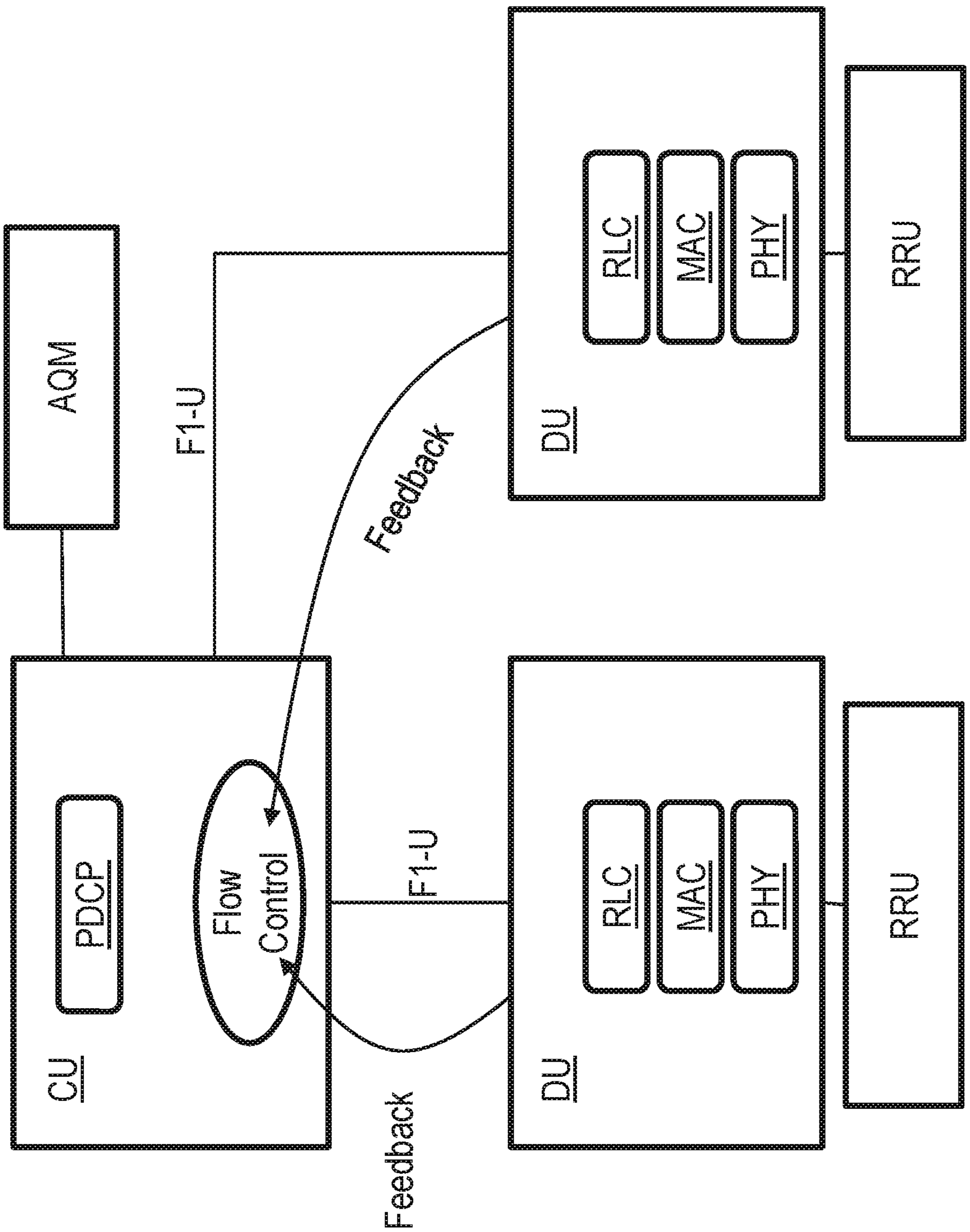
FIG. 3 is a schematic block diagram depicting a gNB split architecture with flow control according to prior art.
Figure 4:
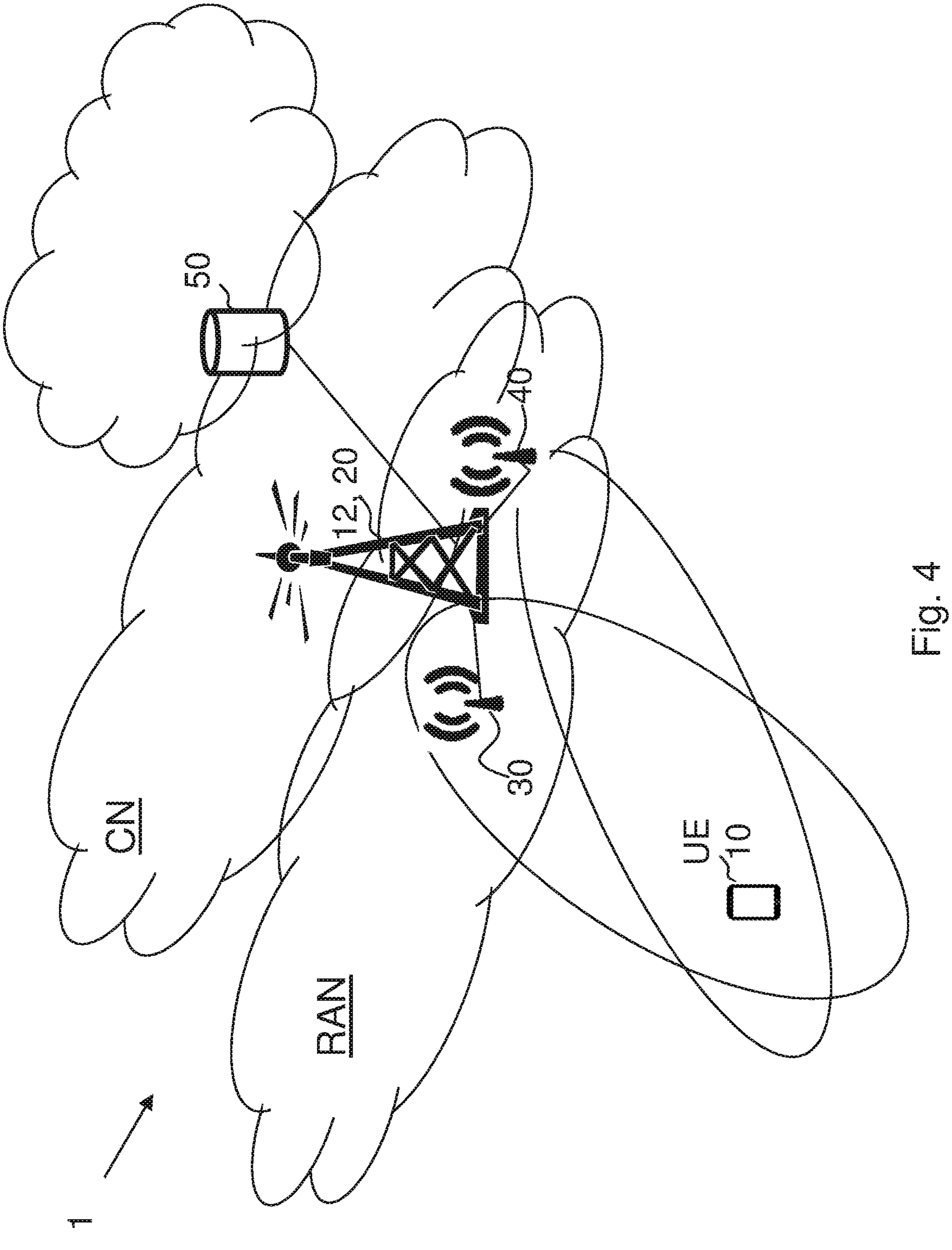
FIG. 4 is a schematic block diagram depicting embodiments of a wireless communication network.

Embodiments herein relate to communication networks in general. FIG. 4 depicts a wireless communication network 1 wherein embodiments herein may be implemented. The wireless communication network 1 comprises one or more RANs e.g. a first RAN, connected to one or more CNs. The wireless communication network 1 may use one or a number of different radio access technologies, such as Wi-Fi, Long Term Evolution, LTE-Advanced, 5G, WCDMA, Global System for Mobile communications/Enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, UEs, e.g. a UE 10, such as a mobile station, a Non-access Point (non-AP) STA, a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things (IoT) operable device, Device to Device (D2D) terminal, mobile device e.g. smart phone, laptop, mobile phone, sensor, relay, mobile tablets or any device communicating within a cell or service area.

The wireless communication network 1 comprises a radio network node 12 providing radio coverage over a geographical area, of a first radio access technology, such as NR, LTE, UMTS, Wi-Fi or similar. The radio network node 12 may be a radio access network node such as radio network controller or an access point such as a Wireless Local Area Network (WLAN) access point or an Access Point Station (AP STA), an access controller, a base station, e.g. a radio base station such as a NodeB, an eNB, a gNodeB, a base transceiver station, Access Point Base Station, base station router, a transmission arrangement of a radio base station, a stand-alone access point or any other network node capable of serving a UE within the first service area served by the radio network node 12 depending e.g. on the first radio access technology and terminology used. The first radio network node 12 may be referred to as source radio network node serving a source cell or similar.

The radio network node 12 may be split into one or more network nodes comprising a central unit, CU 20 and distributed units DU 30, 40 providing the radio coverage. One or more cells may be provided by a RRU associated with the different DUs 30, 40.

According to embodiments herein each DU 30, 40 transmits a packet with a first indication to the UE 10, wherein the first indication is related to end-to-end latency due to a determined load in a respective buffer at the DU 30, 40 e.g. as performed in Low Latency Low Loss Scalable (L4S) marking. Each DU 30, 40 further also transmits to the CU 20, a second or third indication, respectively, indicating a probability that packets are marked from the UE 10. Thus, the CU 20 receives the indications of probability that packets are marked from the UE 10, enabling the CU 20 to determine the congestion and end-to-end latency associated with each of the at least two DUs 30, 40 forwarding said packets to the UE 10, and thus, the CU 20 transmits the packets to the DU 30, 40 with the least associated congestion and therefore achieve lower latency for the packets.

Embodiments herein may also comprise a server 50 in communication with the UE 10, which transmits packets to the UE 10 via the CU 20 and the DUs 30, 40 according to embodiments herein.

Figure 5:
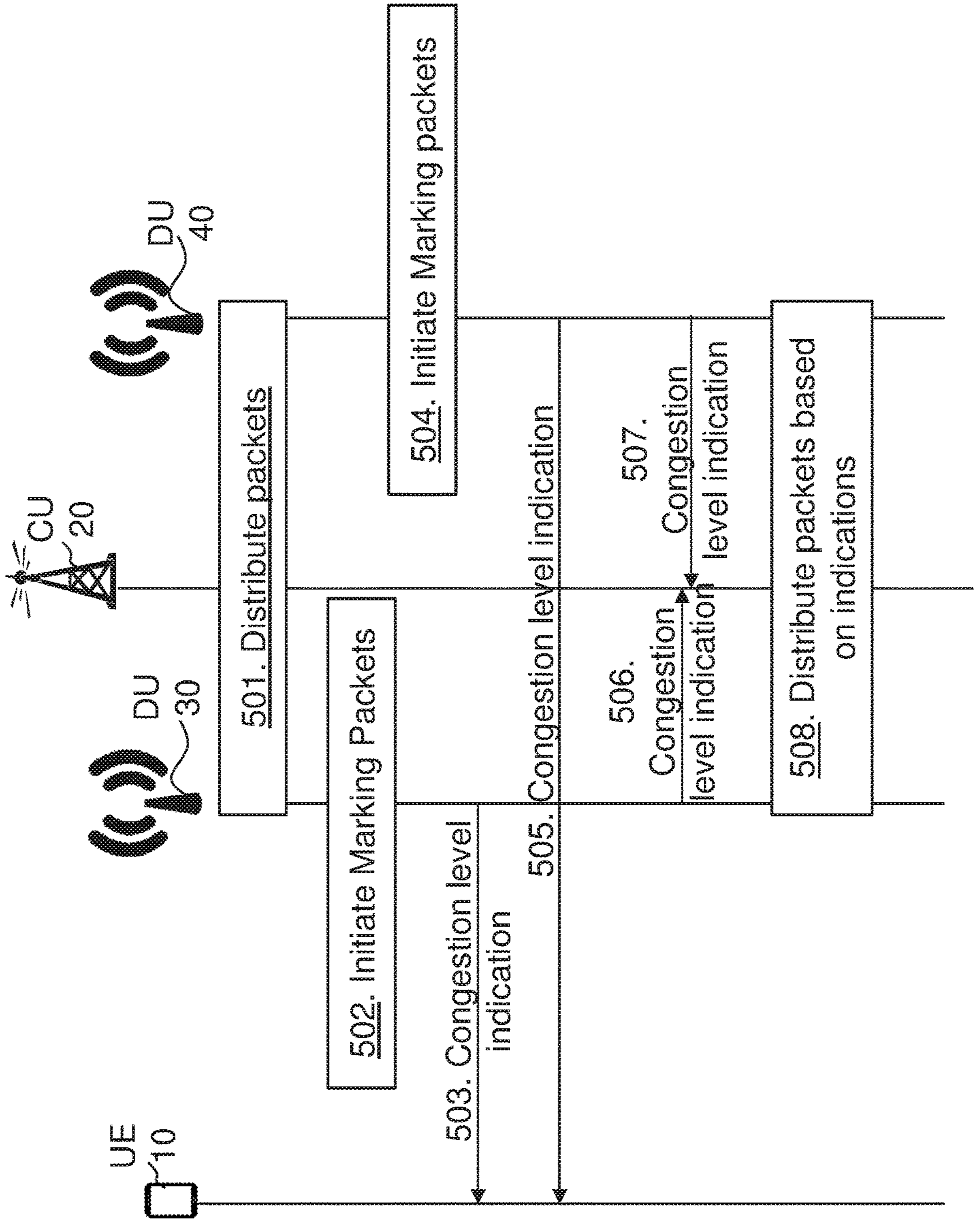
FIG. 5 is a sequence diagram depicting example embodiments of a method in a wireless communication network.

FIG. 5 discloses an example scenario of some embodiments of a method for managing packets in the wireless communication network 1, comprising the UE 10, the CU 20, the first DU 30 and the second DU 40, however the actions disclosed herein also apply to any number of participating DUs.

Action 501. In order to e.g. ensure a higher throughput of packets the CU 20 distributes packets to the different DUs such as the first and second DU 30, 40. The distribution of the packets may initially be based on some parameter or heuristic. Hence in some embodiments the packets are e.g. distributed evenly among the DUs 30, 40 or in some other suitable manner.

This action relates to action 801 described below.

Action 502. To indicate end-to-end latency or congestion related to the first DU 30, the first DU 30 initiates marking packets distributed from the CU 20 e.g. based on end-to-end, latency or congestion in the wireless communication network 1. The congestion or end-to-end latency is associated e.g. with the packets communicated between the CU 20 and the UE 10, transmitted via the first DU 30. As such, the first DU 30 may begin by monitoring and determining the load in a buffer comprised on the first DU 30. The buffer may comprise a queue of packets distributed from the CU 20 and waiting to be forwarded to the UE 10. Due to the determined load, the first DU 30 may be able to indicate the current congestion level and associated end-to-end latency of packets transmitted from the CU 20 to the UE 10 via the first DU 30. This will be further explained below. The marking may e.g. be a marking probability which will also be described more in detail below. The marking of the packets enables the first DU 30 to e.g. determine the congestion level over many packets communicated via the first DU 30 and report it to the UE 10.

This action relates to actions 701 and 702 described below.

Action 503. The first DU 30 then communicates the first indication related to end-to-end latency due to the determined load in the buffer to the UE 10 by e.g. transmitting a packet comprising the above disclosed marking or a marking probability. The first indication, also referred to as congestion level indication, indicates a level of congestion in the wireless communication network 1 e.g. depending on increasing or intolerable end-to-end latency. In this way the UE 10 is informed about the present congestion between the UE 10 and the CU 20 via the first DU 30 in the wireless communication network 1. When the UE 10 receives the congestion level indication the UE 10 may then mark its data or control packets, e.g. IP packets using e.g. Low Latency Low Loss Scalable (L4S) explicit congestion notification (ECN) marking. In this way, the UE 10 indicates, using the transport protocol, e.g. Transmission Control Protocol (TCP), congestion to the sender, e.g. using TCP ACKs to the server 50 which may further respond by reducing its sending rate.

This action relate to action 703 described below.

Action 504. Similarly to the actions taken by the first DU 30, the second DU 40 initiates marking packets based on end-to-end latency and congestion in a respective manner for the packets distributed to the second DU 40. This is performed in a similar way as described above in the action 502. As such, the second DU 40 may begin by monitoring and determining the load in a buffer comprised on the second DU 40. Due to the determined load, the second DU 40, may, similarly to the actions taken by the first DU 30 explained above, be able to indicate the current congestion level and associated end-to-end latency of packets transmitted from the CU 20 to the UE 10 via the second DU 40. In a respective manner, the second DU may also mark its packets with a marking probability or ratio, and may further communicate the markings.

This action relates to actions 701 and 702.

Action 505. The second DU 30 then communicates, in a similar respective manner as the first DU 30 disclosed in action 503, an indication to the UE 10 by e.g. transmitting a packet comprising the above disclosed marking or a marking probability. This is performed in a similar way as described above in the action 503.

As such, the UE 10 now has congestion information for the first and second DUs 30, 40 in communication with the CU 20. Using this information, the UE 10, may now communicate to the server 50, e.g. an indication of congestion between the UE 10 and the server 50 via the first or second DUs 30, 40, wherein the indication may comprise a request to adjust the packet sending rate, e.g. a request to lower the sending rate to adapt to the perceived congestion of the UE 10.

This action relates to action 703 described below.

Action 506. In order to inform the CU 20 about the current congestion or end-to-end latency e.g. relating to the packets distributed to the first DU 30, the first DU 30 thus communicates the second indication to the CU 20, indicating the probability that packets are marked from the UE 10. The second indication may be piggy backed to one or more flow control messages and may comprise a measured congestion level transmitted up to the CU 20. The second indication may in some embodiments be based on the received marked packets from the UE 10 as disclosed in action 503. In this way, the CU 20 is informed with the congestion by indicating a probability that packets are marked from the UE associated with the first DU 30.

This action relates to below actions 704 and 802 described below.

Action 507. In order to also inform the CU 20 about the congestion or end-to-end latency e.g. relating to packets distributed to the second DU 40, the second DU 40 thus communicates a third indication to the CU 20 in a similar respective manner as the first DU 30 as described above in the action 506. Thus the second DU 40 may e.g. transmit to the CU 20 the third indication of a probability that packets are marked from the UE 10. In this way, the CU 20 is informed with the congestion associated with the second DU 40.

This action relate to below actions 704 and 803 described below.

Action 508. The CU 20 is now enabled to distribute packets based on the second and third indications sent from the first DU 30 and second DU 40. The CU 20 may e.g. weight the distribution of packets between the first DU 30 and second DU 40, depending on their respective congestion level indicated by the respective second or third indication. This provides a more effective way to forward packets based on congestion where the CU 20 may identify the most suitable DU 30, 40 for one or more packets to be distributed to. E.g., in some scenarios the CU 20 may distribute a packet to the DU that, based on the second indications, indicates the least congestion or lowest end-to-end latency.

This action relates to action 804 described below.

An advantage with the example embodiment, is that it greatly simplifies flow control in 5G, with savings in both memory and computational complexity, e.g. for the cases where end-to-end flows are L4S capable. The flow and/or congestion control may be reduced to a load balancer that should be possible to implement in an efficient way as a load balancer for network loads. The removal of the flow control gives one less control loop in an already rather complex system and can therefore give better end-to-end performance and user experience.

Figure 7:
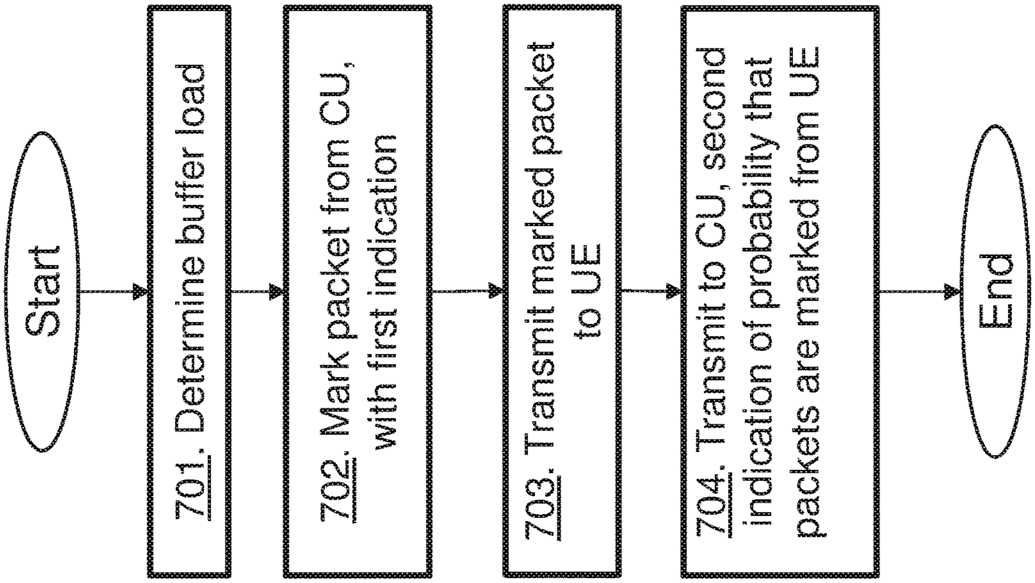
FIG. 7 is a flow chart depicting a method performed by a DU.

The method actions performed by a DU, such as the first DU 30 and/or the second DU 40, for managing packets in the wireless communication network 1 according to embodiments will now be described with reference to a flowchart depicted in FIG. 7. The actions do not have to be taken in the order stated below, but may be taken in any suitable order.

Action 701. According to an example scenario, the CU 20, distributes packets between two or more DUs, which in turn are to be forwarded to the UE 10. In order to perform the forwarding to the UE 10 with minimal end-to-end latency to the DUs, the CU 20 may apply flow control to decide which DU to forward each packet to depending on the end-to-end latency associated with each DU. To start with, the respective DU determines a load in a buffer, respectively. This is e.g. in order to determine the current congestion level in the DU, and further for the DU to be able to report indications relating to end-to-end latency of packets. The buffer may be seen as a queue for data packets, such as control data packets and/or user data packets, which are sent from the CU 20 and are waiting to be forwarded by the DU to the UE 10. Any other buffering or queueing mechanism may be used by the DU, such as a separate queue for marked packets, e.g. dual queues with an L4S queue for marked packets. The load in the DU may refer to how many data packets that are in the buffer or metrics such as resource utilization in the DU 30, 40.

Action 702. In order to identify any congestion in the wireless communication network 1, the UE 10 e.g. may be notified about the current congestion level relating to the load in the buffer comprised in the DU, the DU will therefore mark packets that are transmitted by the CU 20 and to be sent to the UE 10. The DU marks a packet from the CU 20 with the first indication related to end-to-end latency due to the determined load in the buffer. The end-to-end latency may be seen as a measure of the congestion level. This is since an increased end-to-end latency above a minimal latency, derived from a physical distance between the sender e.g. server 50 and the receiver e.g. UE 10 may be an indication of queue build up in a node e.g. radio network node 12 due to congestion.

The marking may e.g. be an L4S marking of the packet.

The DU may mark the packet when the determined load indicates that the network congestion is exceeding a limit or a threshold.

It is not always possible or preferred to directly mark the packet at the DU 30, 40 e.g. when using ciphered PDCP at the CU 20. Instead, the marking may be a marking probability that packets should be marked, e.g. by using L4S marking, to indicate end-to-end latency or congestion in the wireless communication network 1. In some embodiments the congestion refers to specifically the communication between the UE 10 and CU 20 via the DU 30, 40. The marking probability may e.g. be a metric determining the probability of marking a packet at the DU 30, 40 or UE 20. The metric may further relate to a ratio of marked or to be marked packets forwarded by the DU 30, 40. The marking probability may also in some embodiments indicate how likely it is that a packet communicated from the first DU 30 should be marked, e.g. by some other entity such as the UE 10 or CU 20, to indicate end-to-end latency or congestion level present in the communication via the first DU 30. By marking packets related to the probability or ratio, the marking thus enables a way to e.g. determine the congestion level over many packets communicated via the first DU 30.

Action 703. The DU 30, 40 then transmits the packet with the first indication to the UE 10. In this way the UE 10 is informed about the end-to-end latency in the wireless communication network 1. Thus, if the UE 10 receives the first indication of a congested network e.g. due to increasing or intolerable end-to-end latency, the UE 10 may then mark its data or control packets using e.g. L4S marking in order to indicate that the server 50 is sending packets at a too high rate. In this way, the UE 10 may transmit to the sender, such as the server 50, e.g. via TCP ACKs to adjust the sending rate accordingly. In some embodiments the adjustment is to lower the sending rate by a constant or relative factor. As discussed above, in some scenarios it is not possible or preferred to directly mark the packet at the DU 30, 40. Hence in some embodiments the first indication transmitted to the UE 10 is a first indication of marking probability in an RLC control Protocol Data Unit (PDU) or a MAC control element. By sending the first indication of marking probability, it is possible to inform the UE 10 about congestion levels without directly mark the packet as e.g. an L4S packet, which enables the UE 10 to take an informed decision about the congestion level and further, whether to mark data or control packets as a response to indicate congestion to the sender, e.g. the server 50.

Action 704. The DU transmits the second indication to the CU 20. The second indication indicates a probability that packets are marked from the UE 10.

The second indication of the probability of UE 10 that packets are marked from the UE 10 hence informs the CU 20 about a probability if a packet is, or will be marked e.g. as an L4S packet, or how many of the packets from the UE 10, communicating via a DU are, or will be marked. This indication further informs the CU 20 about the current congestion levels in between the CU 20 and the UE 10 via the DU 30, 40. The information further enables the CU 20 to identify the relative congestion levels between two or more DUs 30, 40 and may then be enabled to, as further seen in action 804, transmit a packet to one of at least two DUs 30, 40 based on the congestion level of each of the DUs 30, 40 e.g. by distributing the packets using the load balancer in the CU 20 to direct packets to the less congested DU 30, 40. In some embodiments the second indication comprises a measured congestion level transmitted up to the CU 20, piggy backed to one or more flow control messages. Thus, the second indication may in some embodiments, more precisely disclose the congestion level via the DU 30, 40 by measuring a queue size or delay in the DUs 30, 40 or by measuring the ratio between the transmitted packets and an allocated packet rate based on a resource allocation for a given UE or bearer. In this way, the measured congestion may then be piggy backed using control flow messages, for example using the extensions to the flow control messages defined in 3GPP TS38.425.

The measured congestion level may in some embodiments be a level indication, a value between 0 and 1 and may be represented as a scalar value in floating point or integer format. A quantification between 0 and 1 enables comparisons between congesting levels e.g. previous congestion levels or congestion levels associated with other DUs 30, 40. As exemplified in the pseudo code above, the quantification to a value between 0 and 1 may then further enable an automated way to distribute packets in the CU 20 based on measured or estimated congestion over time in at least two DUs 30, 40.

The first indication sent to the UE 10 in action 702 may in some embodiments result in marking a majority or all of the packets from the UE 10, or in other embodiments, the first indication sent to the UE 10 and the second indication may relate to the same or similar marking probability. Thus, in order to more quickly and effectively indicate congestion to the CU 20, in some embodiments, the second indication may be a same value as the first indication transmitted to the UE 10. In some embodiments the second indication is transmitted to the CU 20 simultaneously or within a timer interval from transmitting the first indication to the UE 10. Thus, the DU 30, 40 ensures regular updates to the CU 20, regarding the current congestion and end-to-end latency.

Figure 8:
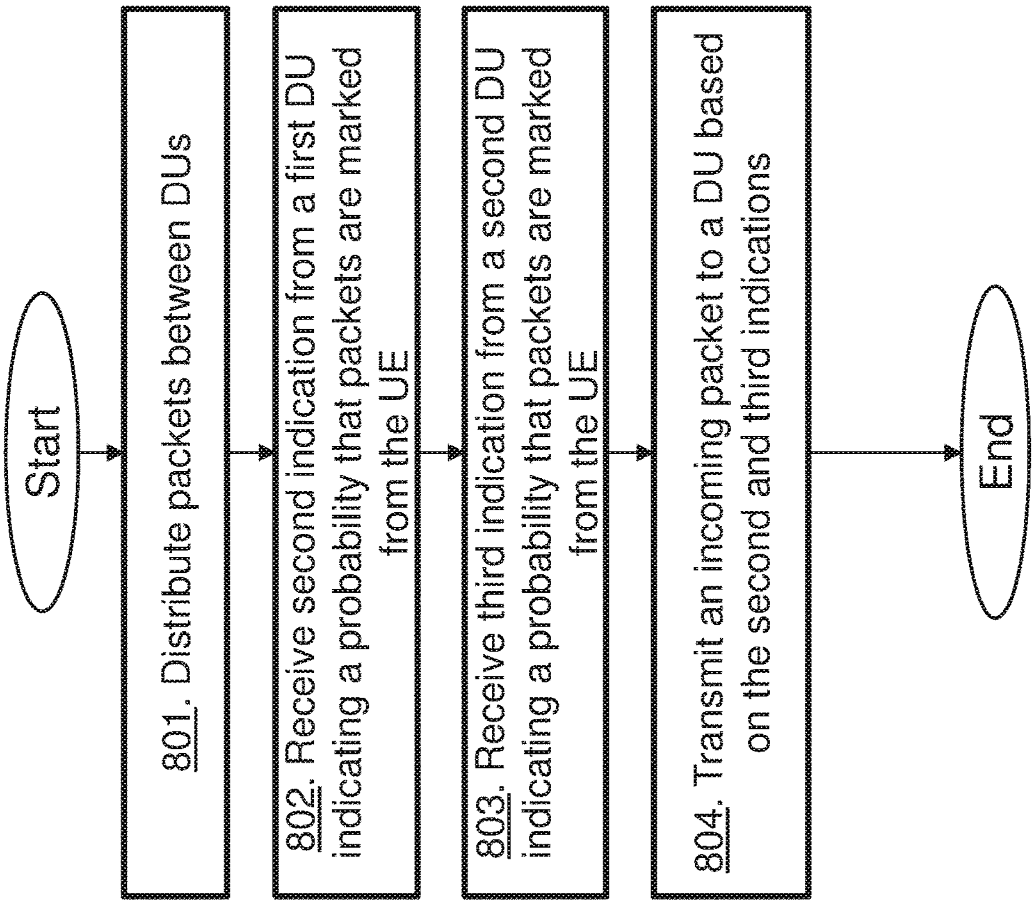
FIG. 8 is a flow chart depicting a method performed by a CU.

The method actions performed by the CU 20 for managing packets in the wireless communication network 1 according to embodiments herein will now be described with reference to a flowchart depicted in FIG. 8. The actions do not have to be taken in the order stated below, but may be taken in any suitable order. Actions performed in some embodiments are marked with dashed boxes.

Action 801. Transmitting all packets over a single DU has the drawback of high end-to-end latency and congestion, instead, the CU 20 distributes packets between two or more distributed units, such as first DU 30 and second DU 40, which also ensures a higher throughput than with a single DU. The packets distributed by the CU 20, may be distributed with the use of a parameter, for example as disclosed by the above disclosed pseudo code, the parameter e.g. identifies how to distribute the packets between the DUs and may be part of the load balancer to ensure that the packets gets distributed to two or more DUs based on the load or congestion associated with each respective DU.

Action 802. In order to be able to distribute packets to the DUs with regards to congestion it is an advantage to know the current congestion or load associated with the first DU 30. Thus, the CU 20 receives a first packet from the first DU 30 with the second indication indicating a probability that packets are marked from the UE 10. In this way, the CU 20 is informed about the congestion associated with packets communicated via the first DU 30. Further, the information may indicate respective or aggregated end-to-end latency of packets forwarded via the first DU 30. In some embodiments the second indication comprises the measured congestion level transmitted from the first DU 30, piggy backed to one or more flow control messages. The congestion level may be the level indication, a value between 0 and 1 and may be represented as a scalar value in floating point, integer format, or any other suitable datatype. As such, the second indication may be the result of a measured congestion level to more precisely inform the CU 20 about the congestion associated with traffic from the CU 20 to the UE 10 via the first DU 30. Furthermore, this information may for simplicity be quantified as exemplified above to more easily be compared to other DUs, in order to enable the CU 20 to forward packets to the DU that has suitable congestion for the packets to be forwarded or transmitted.

Action 803. The CU 20 receives a second packet from the second DU 40 with a third indication indicating a probability that packets are marked from the UE 10. In a similar way as for the first DU 30 explained in action 802 the CU 20 also receives packets informing about latency and congestion associated with packets communicated via the second DU 40. As such, the third indication makes it possible to evaluate which DU is the most effective or suitable DU to handle traffic in terms of end-to-end latency by comparing the information provided by the second and third indications. In some embodiments the third indication comprises a measured congestion level transmitted from the second DU 40, piggy backed to one or more flow control messages. The congestion level may be a level indication, a value between 0 and 1 and may be represented as a scalar value in floating point, integer format, or any other suitable datatype. Hence, as disclosed in action 802, a quantification may enable a more effective way to compare the congestion indicated by the second DU 40 with the congestion indicated by the first DU 30 in order for the CU 20 to forward packets to the DU that has suitable congestion levels or end-to-end latency for the packets to be forwarded or transmitted.

Action 804. The CU 20 is now enabled to forward packets to a preferred DU based on suitable congestion levels or end-to-end latency informed by the second and third indications. The CU 20 transmits an incoming packet to one of the at least two DUs 30, 40 based on the second and third indications. This enables a more effective way to forward packets based on congestion. Further, the transmission of the incoming packet may be adapted to suitable circumstances. E.g., in some scenarios the CU 20 may transmit the incoming packet to the DU that, based on the second and third indications, indicate the least congestion or lowest end-to-end latency. In some scenarios the transmission of the incoming packet may further be determined by a load balancer present in the CU 20. E.g. the load balancer may determine and adjust the distribution of packets to the different DUs 30, 40 e.g. according to the reported congestion level indicated by the second and third indications. In some embodiments the distribution is further adjusted based on previous reported congestion level indications e.g. flow control reports from the different DUs 30, 40.

The embodiments described above will now be further explained and exemplified. The example embodiments described below may be combined with any suitable embodiment above.

L4S Capable Packet Marking.

Embodiments herein may be applied to a case where end-to-end flows are L4S capable. This means low end-to-end latency even when nodes along the packet transport path are congested. An external intro to L4S is available in appendix A of White; Sundaresan; Briscoe; Low Latency Data Over Cable Service Interface Specification (DOCSIS): Technology Overview, CableLabs, February 2019. L4S involves incremental changes to the congestion controller on the sender and to the AQM at the bottleneck. The key is to indicate congestion by marking packets using ECN rather than discarding packets. L4S uses the 2-bit ECN field in the Internet Protocol (IP) header, v4 or v6, and defines each marked packet to represent a lower strength of congestion signal.

Hence, in some embodiments the applied marking may use an L4S marking functionality e.g. using ECN bits in IP header. This marking may be the first indication related to end-to-end latency due to the determined load in the buffer present at the DU 30, 40.

In some embodiments, marked packets are echoed back to the sender, e.g. to the server 50 over TCP ACKs, Quick User Datagram Protocol Internet Connections (QUIC) ACKs or Real-time Transport Protocol Control Protocol (RTCP) from the UE 10 or DU 30, 40 leading to an improved performance of the wireless communication network 1.

Below follows features regarding low latency, low loss and scalable throughput which is attained when utilizing L4S marking in general. The sender may in some scenarios relate to the disclosed server 50.

Low Latency.

The sender's congestion controller, such as the server's 50 L4S congestion controller, may make small but frequent rate adjustments dependent on the proportion or ratio of ECN marked packets. The sender e.g. the server 50, such as its L4S AQM may start applying ECN-marks to packets at a very shallow buffer threshold. This means an L4S queue may be rippled at the very bottom of the buffer e.g. the queue always have low latency with sub-millisecond queuing delay but still fully utilize the link.

Low Loss.

In some scenarios the use of ECN for marking packets e.g. in the CU 20, DU 30, 40 or UE 10 eliminates most packet discard. In turn, that eliminates retransmission delays, which particularly impact the responsiveness of short web-like exchanges of data e.g. Augmented Reality (AR), Virtual Reality (VR), gaming or other services that require low latency and low loss for an optimal user. Using ECN may in this way eliminate or greatly reduce both the round-trip delay for repairing a packet loss e.g. forward error correction or retransmission and retransmission on the transport layer and the delay for detecting a packet loss. Instead, using some embodiments herein, packet losses based on congestion control is eliminated or greatly reduced.

In addition, an L4S AQM can immediately signal to the sender e.g. server 50, queue growth using ECN, thus determining queue growth early, wherein said early queue growth may relate to a fast increase in congestion.

Scalable Throughput.

In embodiments herein congestion control algorithms are scalable, and, applications do not need to concurrently open many connections to fully utilize network resources. In order to overcome that packet discarding causes more packet loss with faster packet rate, an L4S congestion controller, e.g. at the server 50, may, without discarding packets, rapidly increase its sending rate to match any link capacity. This is since the marking procedure used in L4S, uses a scalable congestion controller e.g. the congestion controller used by the sender, e.g. server 50. The scalable congestion controller maintains the same frequency of control signals regardless of packet rate as it does not drop any packets. The scalable congestion controller e.g. at the server 50 may further use the control flow or control packets for indicating congestion which causes a small overhead e.g. 2 ECN marks per round trip on average.

Furthermore, it is assumed that necessary 3GPP standards addition enables efficient L4S marking when queues in the DUs 30, 40 begin to increase. A 3GPP contribution that proposes the addition of an RLC control PDU is found in 3GPP R2-1913888.

As such, some embodiments herein rely on that the properties of L4S capable flows will keep the end-to-end delay low, i.e. close to values given by the minimum Round Trip Time (RTT). Packets are not queued up in the CU 20, instead packets are processed and forwarded down to the DUs 30, 40 as they arrive. Hence, this pushes the queue build up from the CU 20 to the DUs 30, 40.

To keep queues low at the DUs 30, 40, L4S marking may be implemented in the DUs 30, 40 e.g. to prevent queue build-up on the RLC layer similar to action 703 above.

Furthermore, the end-to-end congestion control algorithms e.g. Data Center TCP (DCTCP), Bottleneck Bandwidth and Round-trip Propagation Time Version 2 (BBRv2), may adjust the sending rate in the sender, e.g. server 50 based on the fraction of L4S marked packets transmitted over the two or more DUs 30, 40. In this way, the DU that is more heavily loaded may L4S mark a larger fraction of the packets, and further, the CU 20 may be informed about the proportions of the fractions from the DUs 30, 40 and may further lower the packet sending rate to the DU with the largest fraction of marked packets.

Packet Distribution.

Figure 6:
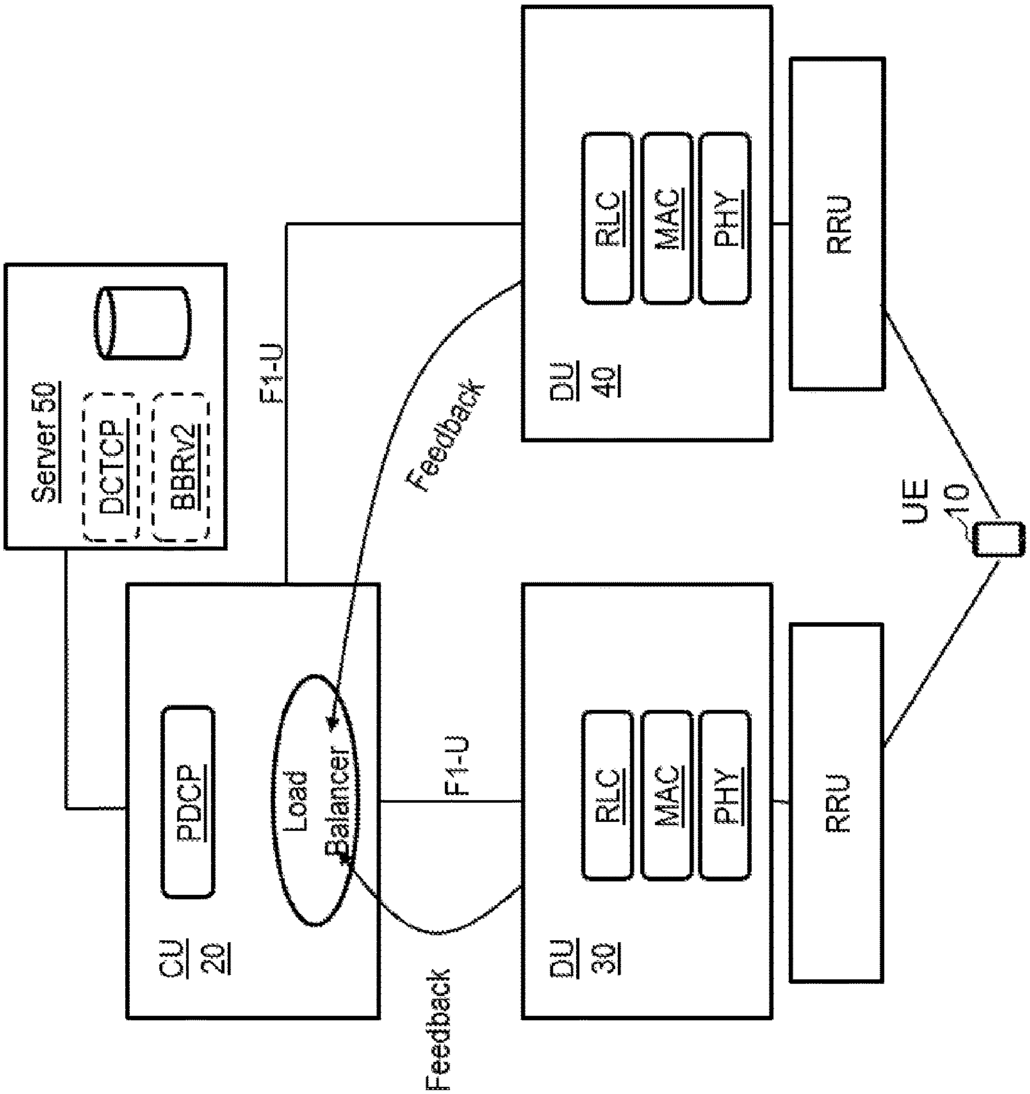
FIG. 6 is a schematic block diagram depicting an embodiment herein.

Because the L4S capable end-to-end flows strive to keep end-to-end delay low, congestion control by discarding packets in CU 20 and DUs 30, 40 is no longer needed. It is however necessary with some mechanism to distribute the packets between the DUs 30, 40, both initially and based on indicated congestion levels as described in actions 801 and 804 above. The distribution may be performed by a load balancer comprised at the CU 20, e.g. as depicted in FIG. 6.

The CU 20 may be connected to some external network node e.g. the server 50 or cloud resource and receives packets from the server 50 using TCP or DCTCP.

In some embodiments, the CU 20, e.g. by use of the load balancer, distributes packets between the DUs 30, 40 based on a probability given by the L4S marking ratio of the DU 30, 40. This probability may also or further be based on the probability that packets are marked from the UE 10.

E.g. if the first DU 30 has a higher L4S marking ratio than the second DU 40, then the packet distribution is adjusted so that a larger fraction of the packets are forwarded to the second DU 40, and vice versa. In this way, a balance is maintained, where each DU 30, 40 will in some scenarios experience the same load and therefore the same L4S marking probability.

Load Balancer.

The load balancer, such as a load balancer at the CU 20, may use and adjust a distribution weight associated with the DUs 30, 40 in order to determine where to forward the packets as explained above. Hence in some embodiments the adjustment of the load balancer distribution weight is performed in the CU 20, based on feedback from the DUs 30, 40 as will be further explained below. The feedback may relate or be based on any of the congestion levels or markings previously disclosed above.

The example pseudo code below describes an example outline of the load balancer algorithm that may be performed by the CU 20. The variable dwLbl represents the load balancer distribution weight, and each DU has a fraction of marked packets known from the CU 20 disclosed as l4sFractionLeg0 and l4sFractionLeg1 wherein updated values may be given as a feedback from the DUs 30, 40.

In a case of only using two DUs 30, 40, as exemplified in the pseudo code, the distribution weight may be set to 0 for distributing all packets to the first DU 30, and set to 1 to distribute all packets to the second DU 40. Hence, in this example the weight dwLbl is representing a proportion of packets that will go to each DU. To further expand this to use more than two DUs 30, 40, the approach may be extended to multiple DUs wherein the probability that a packet is forwarded is computed or otherwise derived based on the feedback from respective DU. E.g., in the case that three DUs are used wherein the probabilities are 0.1 for the first DU, 0.25 for the second DU, and 0.65 for the third DU, then one out of ten packets are transmitted to the first DU, two or three out of ten packets are transmitted to the second DU and the rest are transmitted to the third DU.

The pseudo code further exemplifies how the load balancer may update and adjust the distribution weight based on a constant for adjusting packet rate, difference in marking ratio of the different market packets of DUs 30, 40, previous distribution weights, previous marking ratios of the DUs 30, 40, and time since previous update.

In order to ensure that the distribution is synchronized with the current congestion levels associated with the DUs 30, 40 the distribution weight may be updated on regular intervals or when receiving a feedback from any DU 30, 40.

The CU 20 may then further distribute packets to the DU 30, 40 based on the updated distribution weight.

```
// Load balancer distribution weight
double dwLbl = 0.5;
// dwLbl = 0.0 E.g. Set to 0 when all packets are routed to len 0
// dwLbl = 1.0 E.g. Set to 1 when all packets are routed to leg 1
//Fractions of marked packets per leg
double l4sFractionLeg0 = 0.0; //Initially no markings on first DU
double l4sFractionLeg1 = 0.0; //Initially no markings on second
DU
//Update speed using a constant for adjusting dwLbl
const double alpha = 0.1;
//Update fraction or ratio of marked packets on each leg
onFeedbackLeg0 (struct fb)  {
    l4sFractionLeg0 = fb.l4sFraction;
    updateDwLbl ( ) ;
}
onFeedbackLeg1 (struct fb)  {
    l4sFractionLeg1 = fb.l4sFraction;
    updateDwLbl) ;
}
updateDwLbl ( )  {
```

-continued

```
    deltaT = now − lastUpdateDwLblT; //Time difference
    delta = l4sFractionLeg0 − l4sFractionLeg1 //Difference in ratio
of marked packets
/* update load balance distribution based on load, time
difference, load imbalance and previous distribution and adjust
according to a speed constant alpha*/
    dwLbl = alpha*delta*deltaT + (1-alpha) *dwLbl;
    dwLbl = max(0.0,min(1.0, dwLbl)); //Ensure between 0 and 1
    lastUpdateDwLblT = now;
}
```

Figure 9:
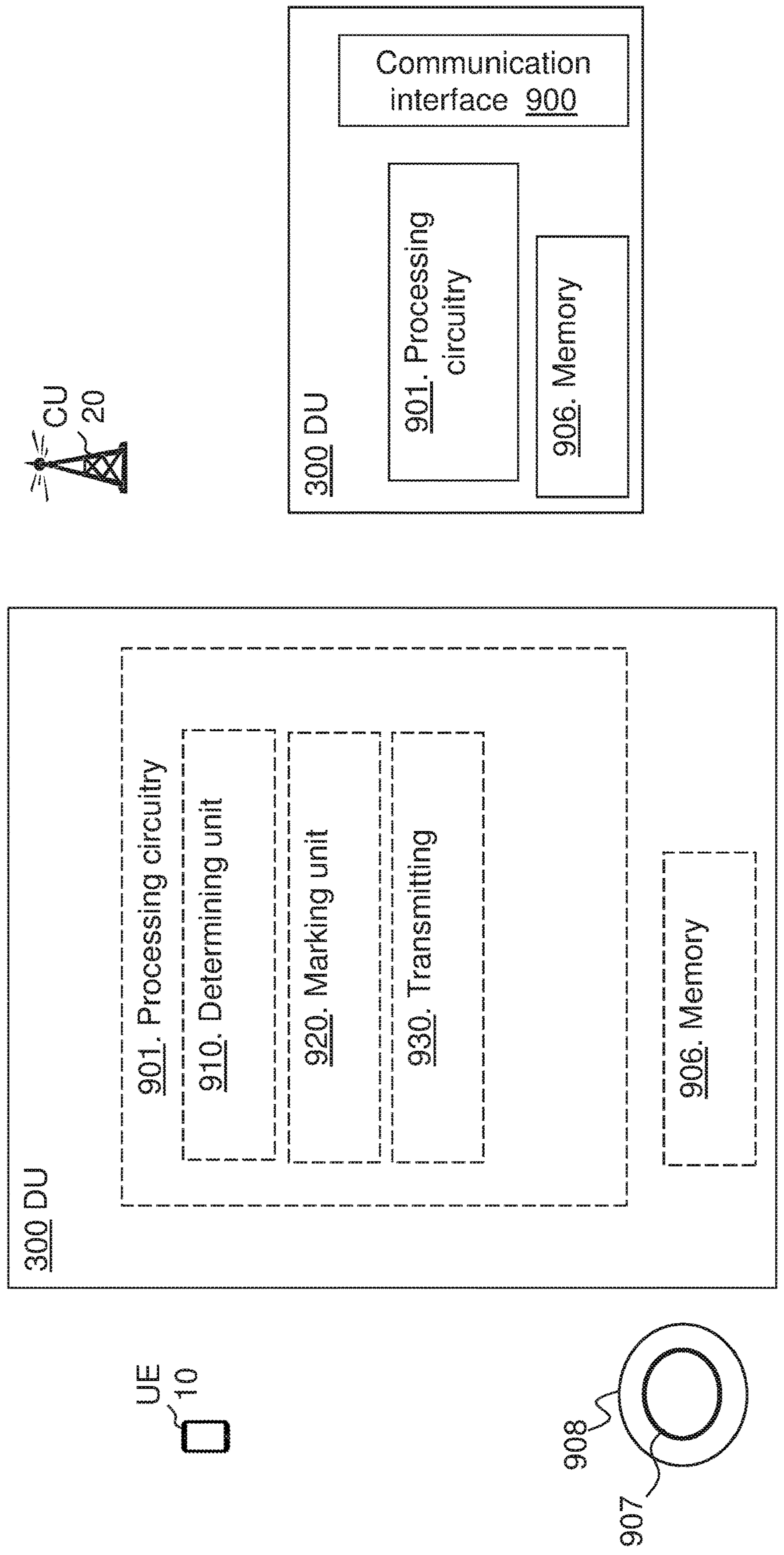
FIG. 9 is a schematic diagram depicting embodiments of a DU.

To perform the method actions above, the DU 300 such as the first DU 30 or the second DU 40 may comprise an arrangement depicted in FIG. 9. The DU 300 is configured to manage packets in the wireless communication network 1.

The DU 300 may comprise a communication interface 900 configured to communicate with network entities such as the UE 10 or the CU 20. The communication interface may comprise a wireless receiver (not shown) and a wireless transmitter (not shown).

The DU 300 is further configured to, e.g. by means of a determining unit 910 in the DU 300, determine the load in the buffer.

The DU 300 is further configured to, e.g. by means of a marking unit 920 in the DU 300, mark the packet from the CU 20 with the first indication related to end-to-end latency due to the determined load in the buffer.

The DU 300 is further configured to, e.g. by means of a transmitting unit 930, such as a transmitter or a transceiver, in the DU 300, transmit the packet with the first indication to the UE and further configured to transmit to the CU 20, the second indication indicating the probability that packets are marked from the UE 10. The second indication may be further adapted to comprise the measured congestion level to be transmitted up to the CU 20, further adapted to be piggy backed to one or more flow control messages. The measured congestion level may further be adapted to be the level indication, a value between 0 and 1 and may further be adapted to be represented as a scalar value in floating point or integer format. The second indication may further be adapted to be the same value as the first indication transmitted to the UE 10.

The DU 300 may further be configured to transmit, e.g. by means of the transmitting unit 930 in the DU 300, the second indication to the CU 20 simultaneously or within a timer interval from transmitting the first indication to the UE 10. The DU 300 may further be configured to, e.g. by means of the transmitting unit 930 in the DU 300, transmit the first indication to the UE as the indication of marking probability in the RLC Control PDU or the MAC Control element.

The embodiments herein may be implemented through a respective processor or one or more processors, such as the processor of a processing circuitry 901 in the DU 300 depicted in FIG. 9, together with respective computer program code for performing the functions and actions of the embodiments herein. The program code mentioned above may also be provided as a computer program product, for instance in the form of a data carrier carrying computer program code for performing the embodiments herein when being loaded into the DU 300. One such carrier may be in the form of a CD ROM disc. It is however feasible with other data carriers such as a memory stick. The computer program code may furthermore be provided as pure program code on a server and downloaded to the DU 300.

The DU 300 may further comprise a memory 906 comprising one or more memory units. The memory 906 comprises instructions executable by the processor in the processing circuitry 901 in the DU 300. The memory 906 is arranged to be used to store e.g. indications, thresholds, buffer status, packets, instructions and associations and applications to perform the methods herein when being executed in the DU.

In some embodiments, a computer program 907 comprises instructions, which when executed by the respective at least one processor in the processing circuitry 901, cause the at least one processor in the processing circuitry 901 of the DU 300 to perform the actions above.

In some embodiments, a respective carrier 908 comprises the respective computer program 907, wherein the carrier 908 is one of an electronic signal, an optical signal, an electromagnetic signal, a magnetic signal, an electric signal, a radio signal, a microwave signal, or a computer-readable storage medium.

Figure 10:
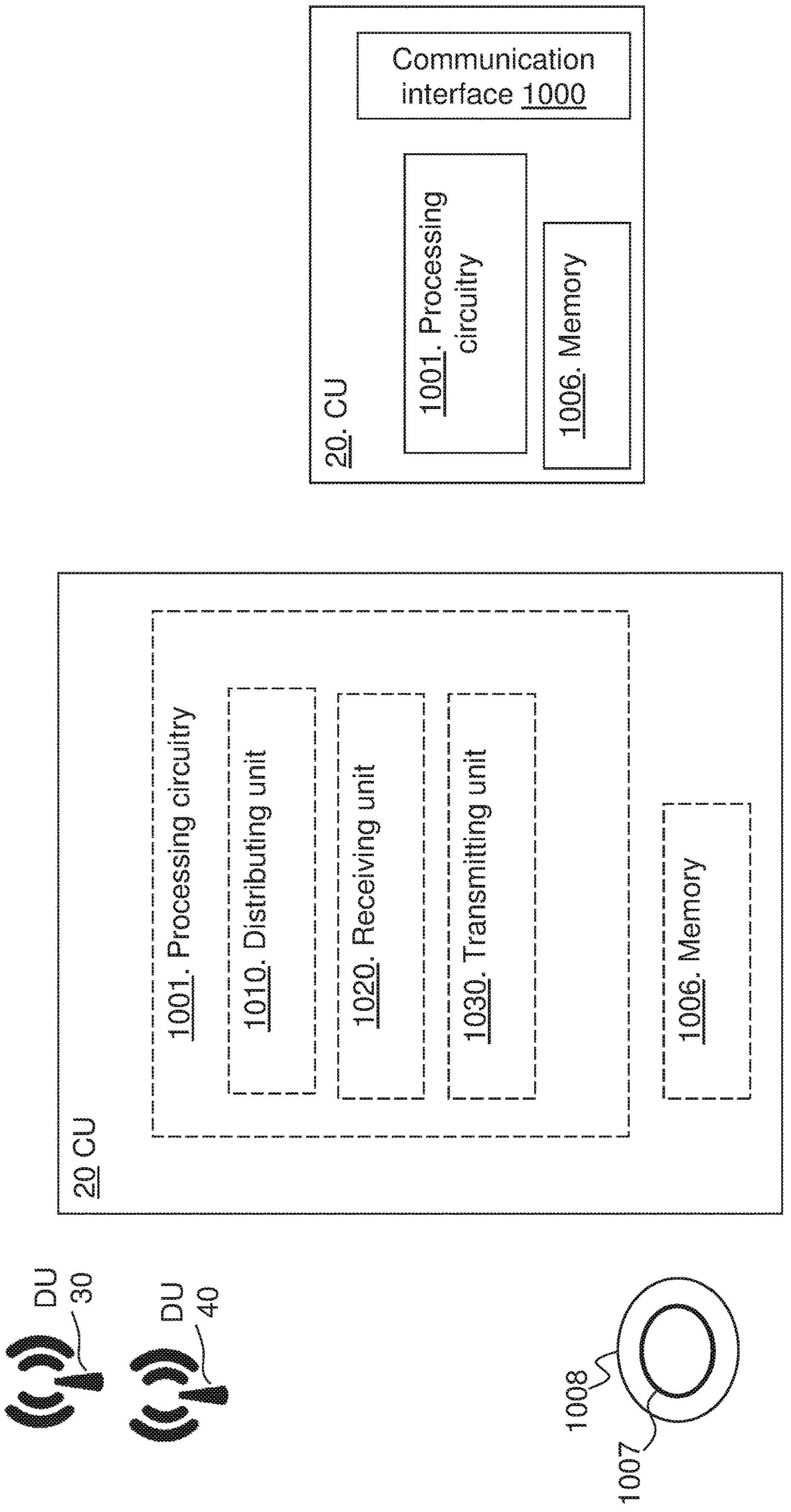
FIG. 10 is a schematic diagram depicting embodiments of a CU.

To perform the method actions above, the CU 20 may comprise an arrangement depicted in FIG. 10. The CU 20 is configured to manage packets in the wireless communication network 1.

The CU 20 may comprise a communication interface 1000 configured to communicate with network entities such as the UE or the DU 300. The communication interface 1000 may comprise a wireless receiver (not shown) and a wireless transmitter (not shown).

The CU 20 is further configured to, e.g. by means of a distributing unit 1010 in the CU 20, distribute packets between two or more DUs 30, 40.

The CU 20 is further configured to, e.g. by means of a receiving unit 1020 in the CU 20, receive the first packet from the first DU 30 with the second indication indicating a probability that packets are marked from the UE 10, and further configured to receive the second packet from the second DU 40 with the third indication indicating a probability that packets are marked from the UE 10.

The second and third indication may each further be adapted to comprise a respective measured congestion level transmitted from each DU 30, 40, piggy backed to one or more flow control messages. The respective measured congestion level may be adapted to be a level indication, a value between 0 and 1 further adapted to be represented as a scalar value in floating point or integer format.

The CU 20 is further configured to, e.g. by means of a transmitting unit 1030 in the CU 20, transmit an incoming packet at the CU 20, to one of the at least two DUs 30, 40 based on the second and third indications.

The embodiments herein may be implemented through a respective processor or one or more processors, such as the processor of a processing circuitry 1001 in the CU 20 depicted in FIG. 10, together with respective computer program code for performing the functions and actions of the embodiments herein. The program code mentioned above may also be provided as a computer program product, for instance in the form of a data carrier carrying computer program code for performing the embodiments herein when being loaded into the CU 20. One such carrier may be in the form of a CD ROM disc. It is however feasible with other data carriers such as a memory stick. The computer program code may furthermore be provided as pure program code on a server and downloaded to the CU 20.

The CU 20 may further comprise a memory 1006 comprising one or more memory units. The memory 1006 comprises instructions executable by the processor in the processing circuitry 1001 in the CU 20. The memory 1006 is arranged to be used to store e.g. second and third indications, adjustable parameters, packets, instructions and associations and applications to perform the methods herein when being executed in the CU 20.

In some embodiments, a computer program 1007 comprises instructions, which when executed by the respective at least one processor in the processing circuitry 1001, cause the at least one processor in the processing circuitry 1001 of the CU 20 to perform the actions above.

In some embodiments, a respective carrier 1008 comprises the respective computer program 1007, wherein the carrier 1008 is one of an electronic signal, an optical signal, an electromagnetic signal, a magnetic signal, an electric signal, a radio signal, a microwave signal, or a computer-readable storage medium.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single Application-Specific Integrated Circuit (ASIC), or in two or more separate devices with appropriate hardware and/or software interfaces between them. Several of the functions may be implemented on a processor shared with other functional components of a radio network node or UE, for example.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Figure 11:
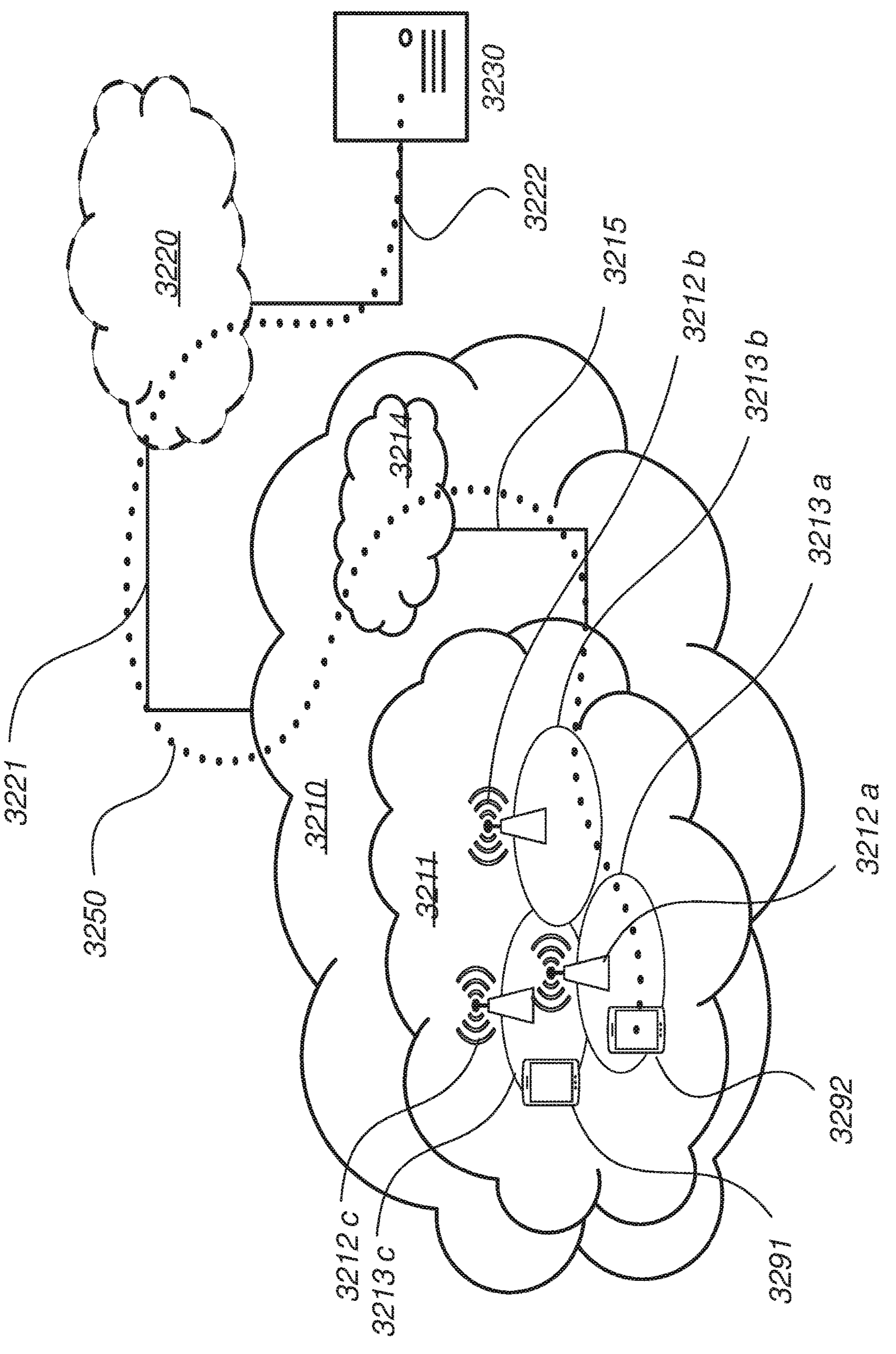
FIG. 11 is a schematic diagram depicting a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs, e.g. radio network node 12 comprising CU 20 and a plurality of DUs 30, 40 or other types of wireless access points being examples of the radio network nodes herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm e.g. the server 50. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an Over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
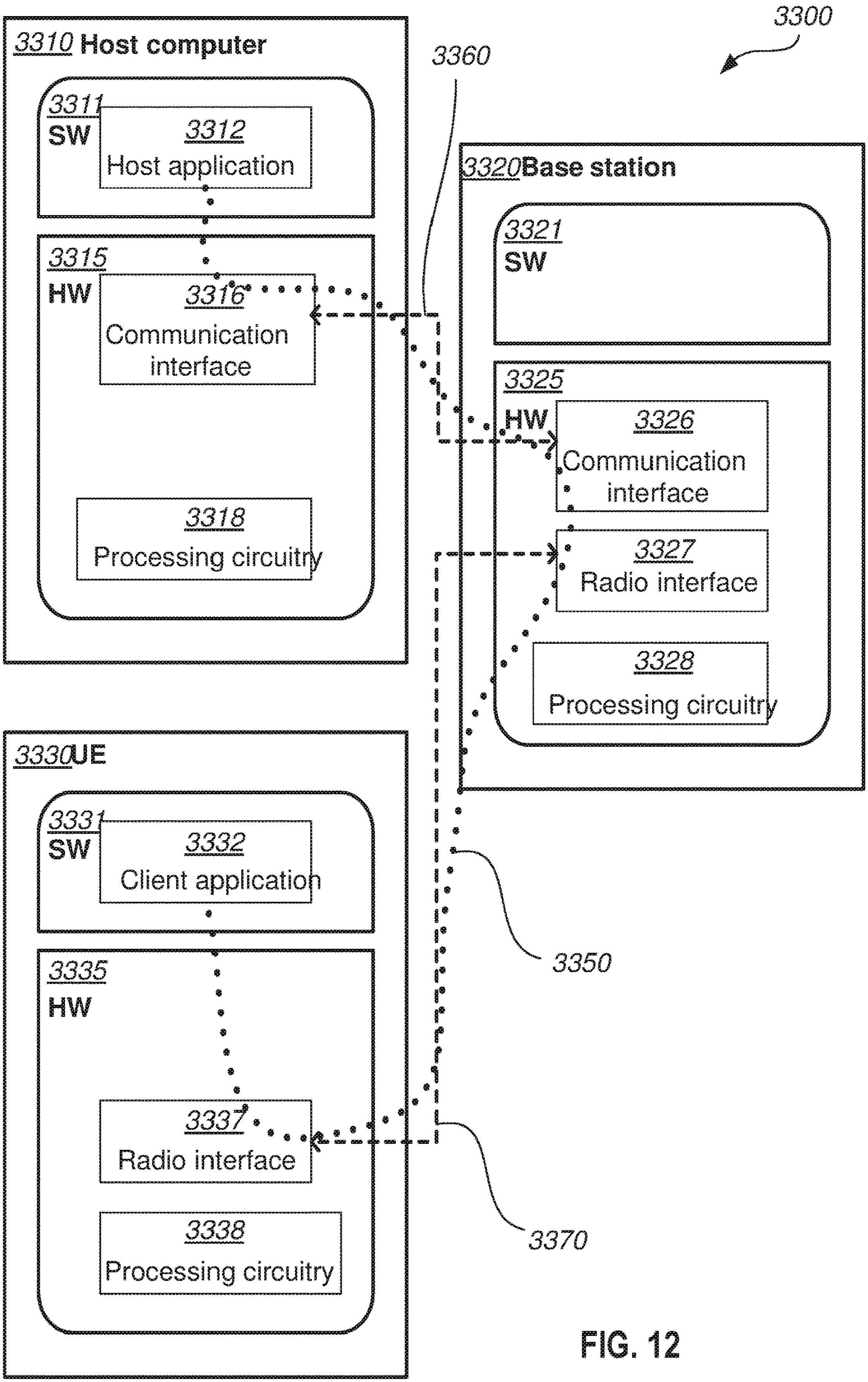
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may reduce latency due to the sent second and third indications and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
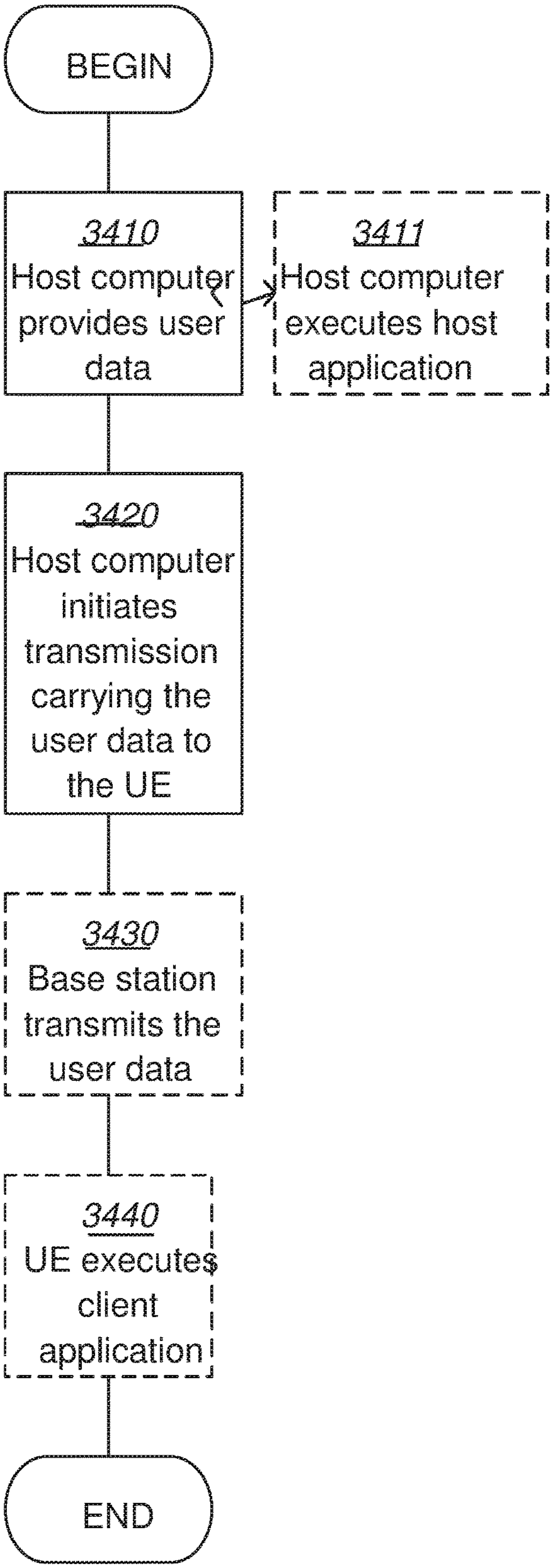
FIGS. 13 to 16 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 14:
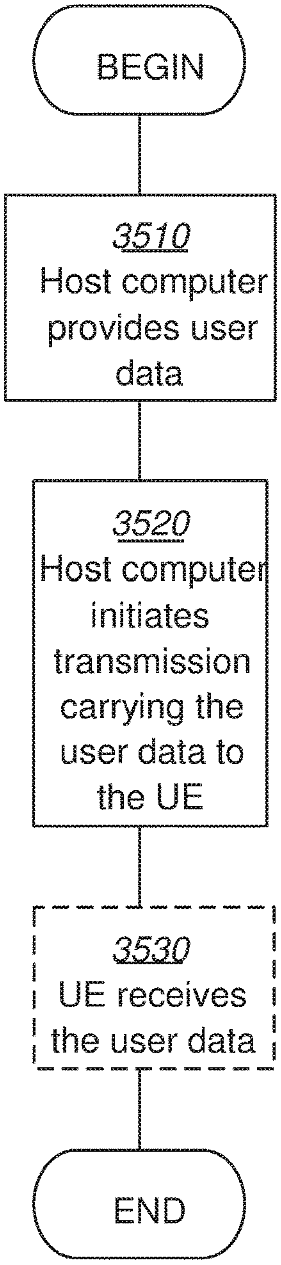

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 15:
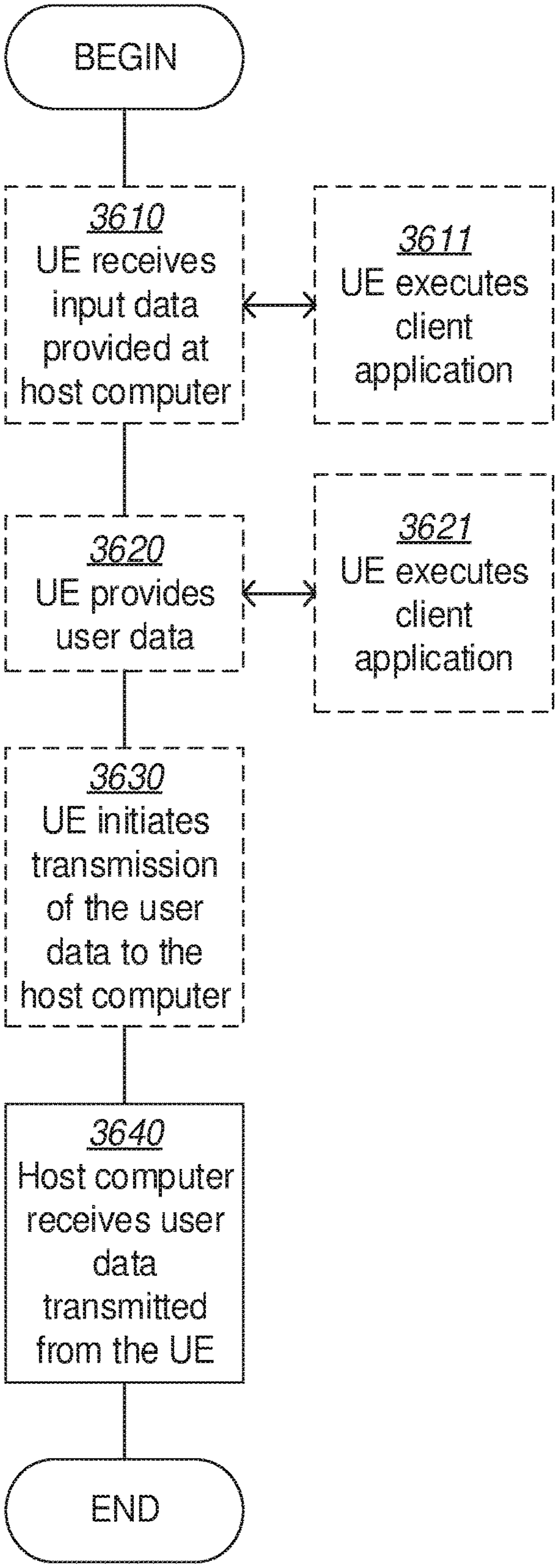

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 16:
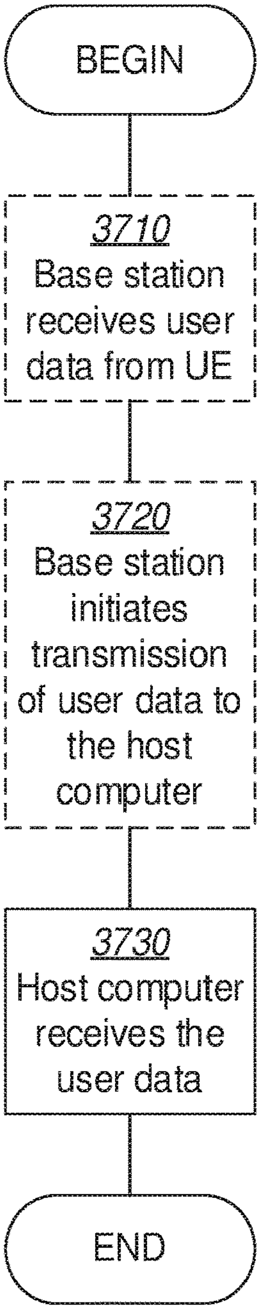

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations

AMF Access and Mobility Management Function
AQM Active Queue Management
CU Central Unit
DCTCP Data Center TCP
DL Downlink
DRB Data Radio Bearer
DU Distributed Unit
E-UTRAN Evolved Universal Terrestrial Access Network
ECN Explicing Congestion Notification
gNB 5G Node B
HO Handover
IV Initialization Vector
LTE Long-term Evolution
L4S Low Latency Low Loss Scalable Throughput
NG The interface/reference point between the RAN and the CN in 5G/NR.
NG-C The control plane part of NG (between a gNB and an AMF).
NG-U The user plane part of NG (between a gNB and a UPF).
NG-RAN Next Generation Radio Access Network
NR New Radio
PDCP Packet Data Convergence Protocol
PDU Protocol Data Unit
PHY Physical layer
RAN Radio Access Network
RB Radio Bearer
RLC Radio Link Control
ROHC Robust Header Compression
RRC Radio Resource Control
RUDI Reduction in User Data Interruption
SDU Service Data Unit
SGW Serving Gateway
SN Sequence Number
TS Technical Specification
TCP Transmission Control Protocol
UE User Equipment
UL Uplink
UPF User Plane Function
Xn The interface/reference point between two gNBs.

The invention claimed is:

1. A method performed by a Distributed Unit, DU, for managing packets in a wireless communication network, the method comprising
determining a load in a buffer;
marking a packet from a Central Unit, CU, with a first indication related to end-to-end latency due to the determined load in the buffer;
transmitting the packet with the first indication to a User Equipment, UE (10); and
transmitting to the CU a second indication indicating a probability that packets are marked from the UE.

2. The method according to claim 1, wherein the second indication comprises a measured congestion level transmitted up to the CU, piggy backed to one or more flow control messages.

3. The method according to claim 2, wherein the measured congestion level is a level indication, a value between 0 and 1 and is represented as a scalar value in one of floating point and integer format.

4. The method according to claim 1, wherein the second indication is a same value as the first indication transmitted to the UE.

5. The method according to claim 1, wherein the first indication transmitted to the UE is an indication of marking probability in one of a Radio Link Control, RLC, control Protocol Data Unit, PDU, and a Medium Access Control, MAC, control element.

6. The method according to claim 1, wherein the second indication is transmitted to the CU one of simultaneously and within a timer interval from transmitting the first indication to the UE.

7. The method according to claim 2, wherein the second indication is a same value as the first indication transmitted to the UE.

8. A Distributed Unit, DU, for managing packets in a wireless communication network, the DU comprising:

processing circuitry configured to:

determine a load in a buffer; and mark a packet from a Central Unit, CU, with a first indication related to end-to-end latency due to the determined load in the buffer; and a communication interface in communication with the processing circuitry and configured to:

transmit the packet with the first indication to a UE; and transmit to the CU a second indication indicating a probability that packets are marked from the UE.

9. The DU according to claim 8, wherein the second indication comprises a measured congestion level transmitted up to the CU, piggy backed to one or more flow control messages.

10. The DU according to claim 9, wherein the measured congestion level is a level indication, a value between 0 and 1 and is represented as a scalar value in one of floating point and integer format.

11. The DU according to claim 8, wherein the second indication is a same value as the first indication transmitted to the UE.

12. The DU according to claim 8, wherein the DU is configured to transmit the first indication to the UE as an indication of marking probability in one of a Radio Link Control, RLC, control Protocol Data Unit, PDU, and a Medium Access Control, MAC, control element.

13. The DU according to claim 8, wherein the DU is configured to transmit the second indication to the CU one of simultaneously and within a timer interval from transmitting the first indication to the UE.

14. A non-transitory computer-readable storage medium, having stored there on a computer program comprising instructions which, when executed on at least one processor, cause the at least one processor to carry out a method for managing packets in a wireless communication network, the method comprising determining a load in a buffer;

marking a packet from a Central Unit, CU, with a first indication related to end-to-end latency due to the determined load in the buffer;

transmitting the packet with the first indication to a User Equipment, UE; and transmitting to the CU a second indication indicating a probability that packets are marked from the UE.

* * * * *